July 16, 1935. J. SLEPIAN 2,008,406
BACKFIRE PREVENTING MEANS FOR RECTIFIERS
Filed July 4, 1931 2 Sheets-Sheet 1
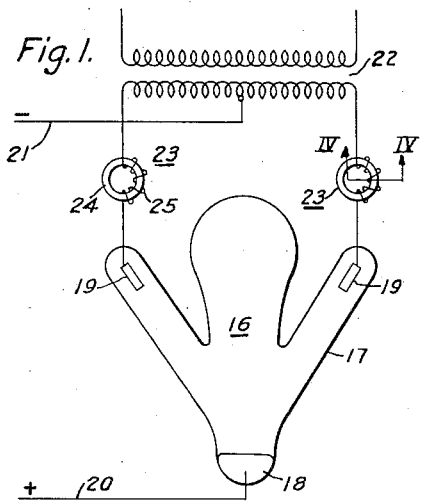
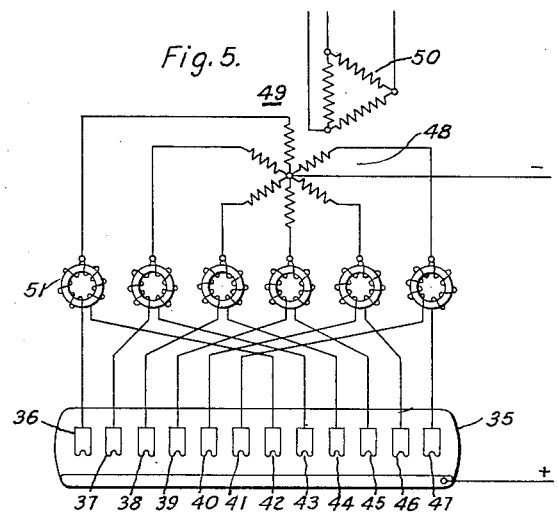
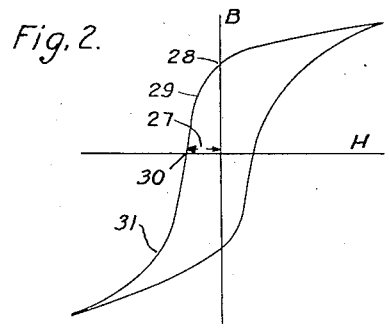
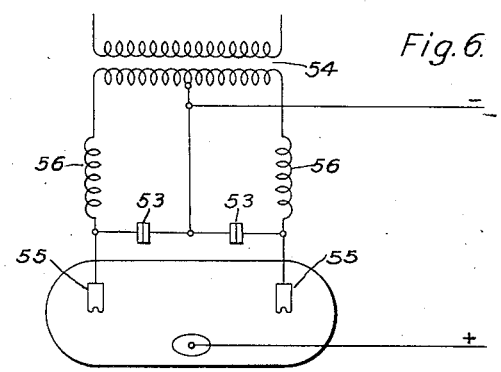
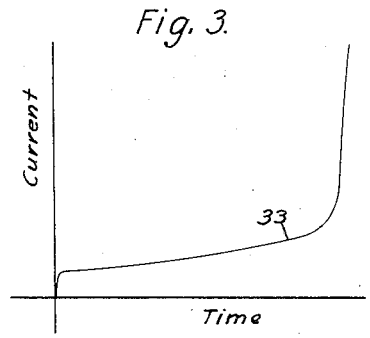
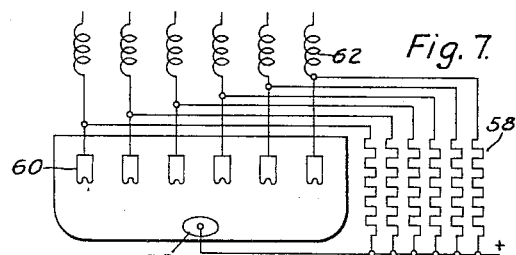
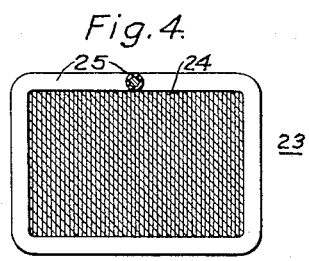
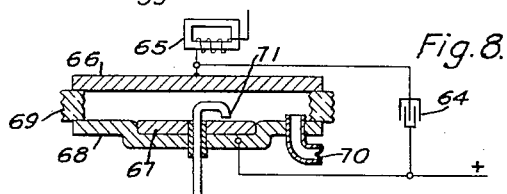
INVENTOR
Joseph Slepian
BY
ATTORNEY July 16, 1935.  J. SLEPIAN  2,008,406
BACKFIRE PREVENTING MEANS FOR RECTIFIERS
Filed July 4, 1931   2 Sheets-Sheet 2
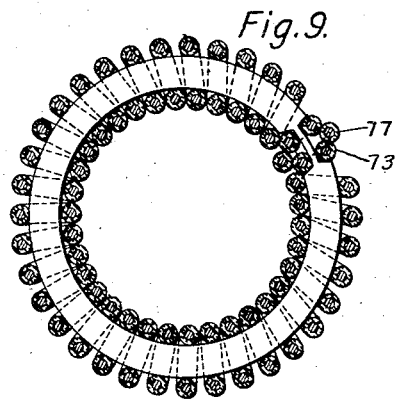
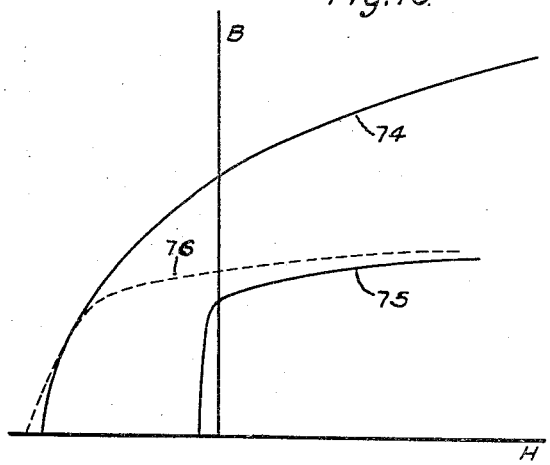
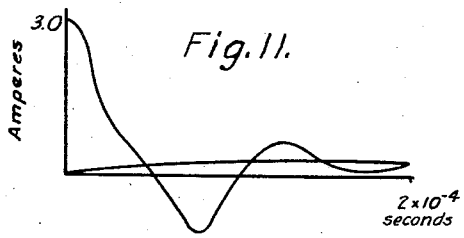
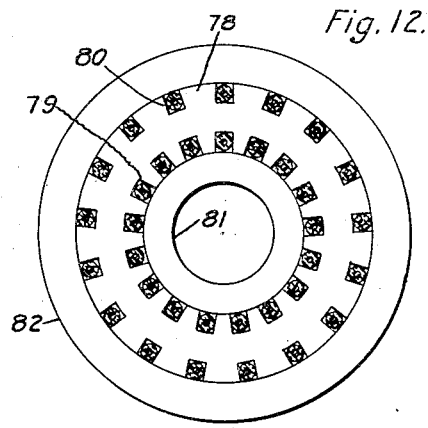
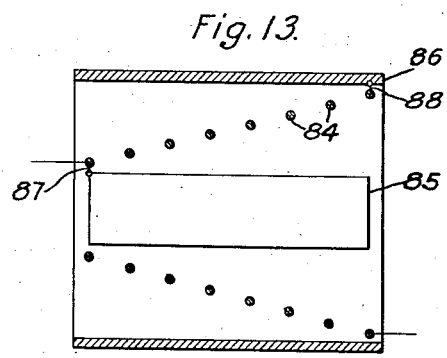
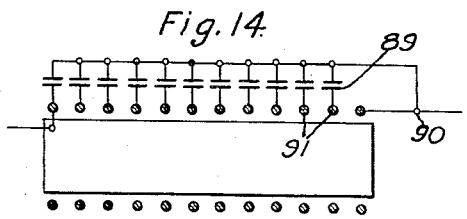
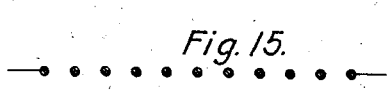
WITNESSES:
INVENTOR
Joseph Slepian
BY
ATTORNEY Patented July 16, 1935

2,008,406

UNITED STATES PATENT OFFICE 2,008,406

BACKFIRE-PREVENTING MEANS FOR RECTIFIERS

Joseph Slepian, Pittsburgh, Pa., assignor to Westinghouse Electric & Manufacturing Company, a corporation of Pennsylvania Application July 4, 1931, Serial No. 548,719

31 Claims. (Cl. 175—363)

My invention relates to backfire-preventing means for rectifiers, and it has more particular reference to metal-tank mercury-arc rectifiers, although it is not limited thereto.

As a result of a long series of experiments on the nature and origin of backfire-causes I have discovered that whatever it is, that causes backfire, lasts, in general, for a very minute period of time, less than could be measured by instruments capable of reading a time as short as ten microseconds. These backfire-causes apparently occur at random, by some laws of chance, not at spaced intervals, but at average rates of speed which are dependent upon the impressed voltage, the size and condition of the space between the backfiring electrodes, etc. A small percentage of these backfire-causes appear to be of longer duration than others. I have found, however, that practically all of the backfire-causes are of shorter duration than 10 microseconds.

I have discovered that when an object makes or breaks contact with an anode during a non-conducting period, that is, when the anode is impressed with a negative voltage, the act of making or breaking the contact constitutes a backfire-cause, possibly as a result of a minute arc at the point of contact. It seems probable that at least some of the backfire-causes in mercury-arc rectifiers are due to the making or breaking of contacts between minute mercury droplets, or even smaller dust particles, with the inactive anodes. Whatever may be the backfire-causes, it is important to have discovered that they are of very brief duration and that they occur at random.

The backfiring process in a rectifier may be analyzed as consisting of two periods. The first period is that in which the precipitating cause is active. These precipitating causes are usually of an unknown nature, but their effect is to cause the voltage across the rectifier (in the reverse sense) to fall momentarily to a low value. The precipitating causes are probably active for only very short times, estimated, from my experiments as being less than from $10^{-6}$ to $10^{-4}$ seconds. An example of the precipitating cause is the making or breaking of contact, with the electrode, of mercury droplets, or other particles, as above noted.

Before a backfire-precipitating cause occurs, the current flowing in the inverse sense through the dark space surrounding the anode is of the order of 10 to 50 microamperes, more or less, per square centimeter of anode surface, or about 10 to 50 milliamperes for an anode having an area of 1,000 square centimeters. This normal inverse current in the rectifier, or glow-discharge current, varies considerably according to conditions, increasing very rapidly with the vapor pressure (approximately as the square of the pressure) and also increasing when the currents flowing to other electrodes are increased, and when the voltage increases.

During the brief moment of time when the backfire-precipitating cause is active, the inverse current through the electrode is building up rapidly. For example, if the rectifier is one having a rating of 600 volts, 1,000 amperes, direct-current, it may be expected that the reactance of the transformer supplying an electrode would normally be about .05 ohms, or the inductance $L=1.32\times10^{-4}$ henrys. The maximum inverse voltage would be somewhat over twice the direct-current voltage, or about 1,500 or 1,600 volts. With an inverse voltage $E=1,500$, the rate of rise of current during the period of activity of the precipitating cause will be $$\frac{E}{L}=\frac{1500}{1.32\times 10^{-4}}=1.14\times 10^7$$

amperes per second. During precipitating times of from $10^{-6}$ to $10^{-4}$ seconds, the current will build up to from 11.4 to 1140 amperes.

This brings us to the second period of the backfiring process, namely, the period immediately following the discontinuance of the backfire-precipitating cause. If the current in the inverse sense builds up to a large enough value, during the precipitating periods, as in the example just given, where currents of 11 to 1100 amperes were attained, then a stable arc will form and will continue to exist even after the precipitating cause ceases. The current then continues to grow, and a short-circuit occurs. It is an object of my invention to prevent a short-circuit, or self-sustaining arc, from occurring as a result of any backfire cause.

Thus, if the current during the period of the precipitating cause has not built up to a sufficiently high value, a stable arc cannot form. It changes to (or continues as) a glow, and if the glow voltage is greater than the supply voltage across the rectifier, the current diminishes again, so that the second period of the backfire, or the period in which a stable arc brings about a short-circuit, does not occur.

As to the amount of current which is necessary to produce a self-sustaining arc, we know that a keep-alive arc, in a single-phase mercury-arc rectifier, must take at least 4 or 5 amperes, direct-current, or it will be unstable and will go out frequently. We known that, at atmospheric pressure, for most electrode materials, an arc, after it is once formed, becomes unstable and changes to a glow at somewhere around .05 amperes. It seems reasonable to assume that a figure of the same order of magnitude will hold for arcs in mercury vapor at low pressures, as in a mercury-arc rectifier, and it may be assumed, further, that glow-discharge currents of somewhat higher value, of the order of .1 ampere, or several tenths of an ampere, will not form into an arc if the backfire-cause ceases before the current gets any larger. Currents even of the order of 1 ampere or more might be expected to form arcs which would become unstable and go out within a time which is short in comparison with the inactive period of the anode.

According to my invention, I place, in series with each anode of a rectifier, an external circuit-means which will hold the inverse current to a value which will not permit the formation of a self-sustaining arc during the continuance of a backfire-cause. These external circuit-means may be saturated reactors or saturated coupled reactors, either by themselves or in conjunction with shunting means, such as a resistance, condenser or lightning arrester connected across the backfiring electrodes, or any other means which will have the effect of a transient (or permanent) rectifier for taking over the rectifying function for periods of the order of $10^{-6}$ to $10^{-4}$ seconds, during which the main rectifier may fail in its rectifying function, and to prevent the inverse current in the main rectifier, during said times of failure, from becoming large enough to produce a self-sustaining arc; or such means for reducing the inverse current to a value which will not sustain an arc within about $10^{-4}$ seconds after the incipience of the backfire-cause.

When such external-circuit means are reactors, as in the specific embodiments of the invention which are shown in the present application, special attention must be given to the design of the reactors, not only to cause them to saturate at currents of the order of an ampere, more or less, but also to have a transient eddy-current effect of the same order of magnitude, or even less, so far as the currents in the windings of the reactor are concerned. Since the reactor saturates at such a low current, it is enormously over-saturated at normal load currents of, say 800 amperes, so that its full load reactance is quite small, thereby avoiding a harmful effect on the regulation-curve of the rectifier. Except possibly where coupled reactors are used, it is ordinarily desirable to adopt measures to reduce the full-load reactance as much as possible, in designing my special reactor, as will be pointed out hereinafter.

Further objects of my invention relate to the details of design of the reactor, which must be observed in order to be able to accomplish my objects.

A still further object of my invention is to radically modify the design of the rectifier itself, so as to utilize an extremely poor rectifier, or even a heretofore impossible rectifier, or one which would have one or even many backfire-causes during each half-cycle, combining, with such a rectifier, external-circuit means, according to my invention, which will prevent any (or scarcely any) backfire-cause from producing a short-circuit within the rectifier. In this way, the cost and space-requirements of rectifiers are very materially reduced, while the average rate of occurrence of backfiring, instead of being 3 or 4 per month, as in present commercial metal-tank, mercury-arc rectifiers, may be reduced to much lower values.

With the foregoing and other objects in view, my invention consists in the circuits, apparatus, systems, and methods hereinafter described and illustrated in the accompanying drawings, wherein:

Figure 1 is a diagrammatic view of a rectifier, utilizing specially designed saturated anode-lead reactors, in accordance with my invention;

Figs. 2 and 3 are curve diagrams illustrative of the performance of the reactors shown in Fig. 1;

Fig. 4 is a cross-sectional view through one leg of the reactor, the section plane being indicated at IV—IV in Fig. 1;

Fig. 5 is a diagrammatic view of circuits and apparatus illustrating the use of coupled reactors, in connection with a multi-phase, metal-tank, mercury-arc rectifier;

Figs. 6, 7 and 8 are views illustrating the use of lightning arresters, resistors and condensers, respectively, to supplement the action of my choke coils, Fig. 8 also showing, in cross-section, an unconventional design of rectifier to illustrate the fact that my invention makes it possible to utilize rectifiers of extremely poor characteristics;

Fig. 9 is a transverse cross-sectional view through a modified form of reactor;

Fig. 10 is a diagrammatic view illustrating the characteristics of the reactor of Fig. 9;

Fig. 11 is a view illustrating the effect of the capacitance between the turns of the winding on the reactor, in what is perhaps an exaggerated case of such capacity effects, and Figs. 12, 13, 14 and 15 are more or less diagrammatic views illustrating four means for overcoming the effects of the capacity between turns, or from turns to the iron core, so as to be able to accomplish the purposes of my invention, in reactor designs which would otherwise be troublesome on account of the capacity currents.

In Fig. 1, my invention is illustrated in connection wtih a double-anode, mercury-arc rectifier, which may be either of the metal-tank variety or the glass-bulb variety. My invention, in its broadest aspects, is not limited to the number of anodes nor to the external circuits of the rectifier, whether rectifying circuits or inverted-rectifier circuits, whether single-phase, 3-phase, 6-phase or 12-phase operation, nor is my invention limited to the type of rectifier, whether it is a mercury-arc rectifier, or space-current rectifier or any other type utilizing dissimilar electrodes, or any other rectifier in which backfire or short-circuit-precipitating causes are of short duration and in which the short-circuit cannot form, or continue, unless the inverse current has attained a certain predetermined value during the continuance of the precipitating cause. By "dissimilar electrodes" I mean electrodes, not only of dissimilar materials, such as mercury and iron or mercury and carbon, but electrodes of even the same materials but differing in shape, temperature, electron-emissivity or other characteristic giving the rectifier its asymmetric current-conducting quality.

In Fig. 1, by way of example, therefore, I have shown a mercury-arc rectifier 16 comprising an enclosed evacuated vessel 17, a mercury cathode 18, two anodes 19, positive and negative rectified-current leads 20 and 21, a source of alternating-current power 22 and a specially constructed anode-lead reactor 23 in series with each of the anodes 19. Each anode-lead reactor 23 comprises a laminated core 24, preferably of ring-shape, on which is wound an insulated cable 25 having a sufficient number of turns to give the desired characteristics, as hereinafter described, and having a current-carrying capacity sufficient to carry the full load currents of the anode with which it is connected.

My reactors 23 are unique in being designed to saturate at an extremely small current, of the order of an ampere, or about one-thousandth of the rated full-load current of the reactor. These reactors carry currents of the order of 800 or 1,000 amperes in one direction. The inverse current in normal operation is of the order of 10 to 50 milli-amperes.

The type of saturation curve of the magnetizable core 24 of such a reactor is shown in Fig. 2, in which either the magnetic induction B, in gausses per square centimeter in the iron, or the flux $\phi$, or B times the area A of the iron core, is plotted against the magnetizing force H, in gilberts per centimeter of length of the core, or in ampere turns IT. The relations between B and $\phi$ and between H and IT and are as follows:

$$B = \phi A \quad \text{(1)}$$
$$H = \frac{.4\pi IT}{1}, \quad \text{(2)}$$

where 1 is the length of the core in centimeters. The magnetization curve is a property of the magnetizable material which is utilized for the core, and it is a known constant of each material, or grade of iron or steel, or iron alloy, which is available on the market. A narrow hysteresis curve, such as that shown in Fig. 2, may be obtained by plotting the magnetizing force H or IT on a sufficiently small scale.

According to my invention, I make the magnetizable core saturate when the current through the coil is one ampere, more or less, the departure of the saturating current from this value being discussed subsequently, in this specification. Perhaps it would be more proper to say that the coercive current 27 in Fig. 2, or the inverse current necessary to reduce the remanent magnetism (Fig. 2) to zero, is somewhere around one-tenth of an ampere.

To design a reactor in accordance with my invention, with particular reference, for the moment, to the magnetizing currents of the reactor, that is, neglecting eddy-currents for the time being, we first determine how much of a flux-change, or change in magnetic induction B, is to be permitted in the reactor core, during the time when a backfiring-cause continues, or during the time when the longest backfiring-cause for which the reactor is to be designed continues. This flux-change or induction-change may be from the point 28 on the curve to the point 29, 30 or even 31, or any intermediate value, according to the factor of safety which is to be allowed for possible second or third backfire-causes in any given half-cycle. This value of the flux-change, or change in induction B, is then read off of the hysteresis curve which is known for each sample of magnetic material.

Next, the inverse voltage which the rectifier must withstand is to be considered. This voltage, for a 600-volt rectifier, may be taken, for example, as 1600 volts maximum. If this voltage is impressed on the reactor, then $$E = \frac{\Delta B}{\Delta t} AT \times 10^{-8}, \quad \text{(3)}$$

where $\Delta B$ is the total change in induction to be permitted in the time $\Delta t$, which may be taken as $10^{-4}$ seconds or $10^{-5}$ seconds or even less, depending upon the number of unsuppressed back-fires which are to be tolerated in a given length of time such as a year or a number of years.

We thus have two equations (2) and (3) for solving three unknowns, namely, the number of turns T, the mean core-length 1 and the core-area A. It is easy, therefore, to work out a design for the reactor in accordance with these two equations.

For example, we might impose the condition that we will utilize only a single layer of coil on the core 24, and that we will make the core circular in shape and as small as possible. In other words, the inner coil-sides of the turns will be touching each other and touching the inner periphery of the core. In this way, the leakage reactance is reduced to a minimum, and hence the reactance of the reactor at full-load current will be a minimum, thereby having a minimum effect upon the regulation of the rectifier, which is usually desired. This gives us a third condition, which fixes the three unknowns T, 1 and A. Thus $$1 = \pi\left(\frac{Td}{\pi} + d + \sqrt{A}\right), \quad \text{(4)}$$

where $d$ is the outside overall diameter of the insulated cable which constitutes the winding of the reactor. This formula assumes a square cross-section of the core, thus giving a radial thickness of the core which is equal to $$\sqrt{A}$$

If a rectangular core section is to be used, a suitable multiplying factor should be applied to the term $$\sqrt{A}$$

in equation (4).

The solution of the three simultaneous Equations (2), (3) and (4) gives $$T^{3/2} - \frac{\pi d H^{1/2}}{.4\pi I - dH} - \frac{\pi H E^{1/2}}{.4\pi I - dH}\left(\frac{\Delta t}{\Delta B}\right)^{1/2} \times 10^4 = 0, \quad \text{(5)}$$

which may be solved for $T^{1/2}$, thus fixing the number of turns T. Substituting the value of T in Equations (2) and (3), respectively, gives the core-length 1 in centimeters, and the core-area A in square centimeters.

As a further means for reducing the full-load reactance, (in addition to specifying a single-layer winding) I prefer to build the cores of my self-inductances, such as the reactors 23 of Fig. 1, by using all-continuous ring-punchings, so as to avoid even the minute air gaps between joints in the punchings. In furtherance of this same end, namely, reducing the reactance of the reactor when the rectifier is carrying load, it is desirable to make the flux-change, such as 28—29, 28—30, 28—31, during the continuance of the longest backfire cause, as great as possible. This is because the reactance is given by the slope of the hysteresis curve, and it is desirable to have as large a ratio as possible between the reactance which is effective during the backfire-cause and the reactance which is effective when the rectifier is carrying load-currents. This ratio may be made as high as 200 or 300, or considerably more, by proper design.

When I had reactors made in accordance with the ideas just explained, and when I tested these reactors by means of a cathode-ray oscillograph, I found that there was a practically instantaneous current of the order of several amperes which flowed as soon as voltage was applied to the reactor, simulating the conditions in actual operation, when the collapse of the voltage within the rectifier, during the continuance of the backfire-cause, suddenly applies the voltage which formerly existed in the rectifier across the reactor. The current-time characteristic of the reactor was of the general shape shown in Fig. 3, the slope of the horizontal portion of the curve, after the initial building-up of the current, being somewhat greater than the slope corresponding to the calculated reactance of the reactor, because of the continued effect of eddy-currents, until the flux in the reactor was sufficient to saturate the iron core in the negative direction, at which time the current-time curve turned suddenly upward, at a time of the order of some 30 or 40 micro-seconds.

These eddy-currents introduced a new problem in the design of the reactors, which was quantitatively not anticipated, as eddy-currents are commonly neglected in calculating the reactances of transformers and reactors. Owing to the smallness of the currents with which I am dealing, during the continuance of the backfire-cause, and owing to the rapidness of the transient in the very brief period of time during which my reactor must be operative, these eddy-currents, mostly in the laminations, thus have a material effect on the reactor performance. The equivalent current-component in the coil 25, due to the eddy-currents in the core 24, is given by the equation $$I_0 = a \cdot \frac{E 1 b^2}{4 A_\rho T}, \qquad (6)$$

where $a$ is a coefficient which takes into account the skin-effect of the eddy-currents in the iron, $b$ is the thickness of the laminations in centimeters, and $\rho$ is the resistivity of the iron in absolute units. The coefficient $a$ is not a constant in general, but varies with time. To obtain $I_0$, it may be taken as constant and may be determined experimentally. It is believed to be of the order of .01 to .1, depending on the lamination thickness.

In order to reduce the peak of the eddy-current component $I_0$ to a value somewhere around the same order of magnitude as the coercive current $I$, or even smaller, I reduce the thickness of my laminations very materially, and to this end, I prefer to use hipernik, which is an alloy of approximately 50% nickel, 50% iron and varying quantities of manganese up to 1%, instead of the silicon-steel which I at first used. My first reactor used punchings from material which is commonly used for iron-core reactors, namely, silicon-steel sheets having a thickness of 14 mils or .035 centimeters. The eddy-currents were much too high. I next built a reactor using the same material for the core, but rolled into sheets having a thickness of 5 mils or .0125 centimeters. The eddy-current effect was still too high. As this was the practical limit of thickness of the silicon-steel, I next resorted to hipernik, rolled to a thickness of 2 mils or .005 centimeters. It is believed that even thinner laminations may yet be used. As the eddy-currents rapidly increase in value if there are any currents between the laminations, it is necessary to observe careful precautions in insulating the laminations from each other, which may be done, for example, by means of water-glass or any other insulating coating which is known to the designers of electrical apparatus.

Equation (6), for the eddy-current component $I_0$ of the current in the coil, is written on the assumption of a square cross-sectional area $A$ of the iron. If a rectangular area is utilized, as it probably would be in practice, a multiplication-factor must be used with $A$, as previously indicated in connection with Equation (4). It will be noted that the eddy-current effect may be reduced by reducing the mean length $e$ of the magnetic circuit, which may be done by utilizing a rectangular area $A$ having its minimum dimension in the radial direction, thereby also introducing a multiplying factor (greater than 1 in the ratio of length to breadth of the rectangle) in the denominator of Equation (6), thus still further reducing the eddy-current effect $I_0$. The current $I_0$ may also be reduced rapidly by decreasing the thickness $b$ of the laminations, the current being reduced in proportion to the square of the thickness. The eddy current effect may also be reduced by choosing iron of high resistivity. The eddy-current effect may still further be reduced by choosing a coil having as many turns $T$ as possible.

By the various means just described, the eddy-current effect may be brought down to such low value that the current-scale in Fig. 3 is reduced to a point where the current 33, at a time of any predetermined value, such as 30 or 40 microseconds, may be of the order of one-tenth of an ampere or a few tenths of an ampere.

In Fig. 4, which shows a cross-sectional view of the reactor 23, it has been impossible to show the laminations 24 as thin as they really are, as the lines would be too close together to show up on the drawings.

It will be noted that the times of which I have been speaking, namely, times of from 1 to 100 microseconds, are very short as compared to the time of a half-cycle of a 60-cycle current, a half-cycle of which is 8,330 microseconds.

In Fig. 5, I have shown my invention applied to a rectifier system in which multiple anodes are connected to the same transformer tap, and connected by means of coupled reactors. Thus, a metal-tank rectifier is indicated very diagrammatically at 35, having twelve anodes 36 to 47, supplied from a 6-phase, star-connected, secondary winding 48 of a transformer 49 having a 3-phase delta primary winding 50. The anodes are connected, in pairs, to the respective secondary terminals of the transformer, through coupled reactors 51 of my invention. Thus, the anodes 36 and 42 are connected to the terminals of the coil on the reactor 51, and the midpoint of this coil is connected to the appropriate secondary terminal. This coupled reactor is designed, in accordance with the principles already indicated, so as to limit the current, whenever a backfire-cause is effective with respect to one of the anodes, to a value which will not produce a self-sustaining arc after the termination of the backfire-cause, which, as above pointed out, occurs, practically always, in much less than 10 microseconds.

The advantage of the coupled-reactor connection of Fig. 5 may be understood from the following considerations. Backfire is an infrequently occurring phenomenon in most rectifiers. Even in a very poor rectifier, in which an anode backfires on an average of once an hour, which would be entirely impractical as a commercial rectifier, the anode functions satisfactorily through 216,000 operations or cycles, to each one cycle in which it fails. If, in place of one anode, two anodes in parallel were used, the chances of both anodes backfiring in any given half-cycle in this rectifier would be (216,000)$^2$, or such a double backfire would occur on an average of once in 216,000 hours, or nearly thirty years, on an average, between occasions when a backfire occurs in each of the two coupled anode-circuits in the same half-cycle.

The chances of a simultaneous backfire in both anode-circuits at once is much more remote, because of the very short duration of a backfire-cause, and because of the fact that my reactor 51 does not permit an arc to follow a backfire-cause for even as long as the remainder of the half-cycle. Thus, if my coupler-reactor can clear up an incipient backfire within one-thousandth of a half-cycle, the chances against simultaneous backfire-causes appearing in the two coupled anode circuits in the same thousandth of any given half-cycle would be million-fold more remote than the figures just given.

The advantage of using a coupled-reactor 51, as distingushed from the self-inductance reactor 23, is that these coupled reactors, or balancing transformers, permit the free flow of current to the anodes as long as the currents are divided equally. Thus there is little opposition to the flow of current into the anodes during the normally conducting part of the cycle, as both of the coupled anodes are able to carry current at the same time. The problem of limiting the full-load reactance of the reactor to as low a value as possible, in order to avoid a too-great drooping of the voltage-load characteristic of the rectifier, as in the system shown in Fig. 1, is thus avoided in the coupled-reactor circuit in Fig. 5. It is possible to use multi-turn reactors, and even reactors having air gaps in their cores.

The novel feature of my coupled-reactor 51 is that it will saturate at a current of somewhere around one ampere or one-thousandth of the full-load current, more or less, and that its initial current-flow on the application of the maximum inverse voltage of the rectifier system, is of the same order of magnitude, as previously pointed out in the discussion of the eddy-current effects.

The amount of current which the reactor permits to build-up during any predetermined time-interval, such as 10 microseconds, is not a hard and fixed value of current, but it may be varied, within reasonably wide limits, according to the degree of perfection of operation which is required, or which it is economical to provide. Thus, for example, it possibly would not be economical to go to additional expense to prevent a rectifier from backfiring once in 100 years, as distinguished, for example, from once in 20 years. Sometimes, in order to use reactors of relatively small size and cost, it is possible to prevent backfire from occurring as a result of a relatively small percentage of the backfire-causes, rather than straining at a percentage of 99.999% or something of that order.

At any event, it is not possible, with reactors of practical size, to prevent the inverse current from growing, during the continuance of a backfire-cause, to a value many times more than the normal value of 10 to 50 milliamperes. After the disappearance of the backfire-initiating cause, this augmented current must continue to flow through the reactor for a little time, because of the inductance. This current-flow, in the rectifier, will take the form of a glow-discharge of very high voltage. This high voltage is objectionable in itself because it endangers insulation, but what is still more important, it increases the danger of a second initiating-cause occurring before the inverse current through the rectifier is reduced to somewhere near a normal value, as it has been found that the frequency of the occurrence of the initiating-causes increases very rapidly as the voltage is raised. The occurrence of a second initiating-cause, while the current through the reactor is large, permits the current to increase still further, and thus greatly increases the probability of the development of an arc and a short-circuit.

I prefer, therefore, to use voltage-limiting means to keep the voltage across the rectifier to a moderate value after the disappearance of the backfire-cause. Such voltage-limiting means may be a valve, such as is used for lightning protection, or a resistor, or a condenser. It may be connected only across the alternating-current terminals (the anodes) if it is suitable only for alternating-current, or it may be connected across each anode and the cathode.

In Fig. 6, I have indicated the voltage-limiting means as a group of autovalve arresters 53 having one common terminal which is connected to the neutral terminal of the secondary transformer-winding 54, and having their other terminals connected to the respective anodes 55. Inverse-current-limiting reactors 56, as previously described, are connected in the supply-leads of the anodes. The autovalve arrester 53 is described in my Patents Nos. 1,509,493 and 1,509,497 granted September 23, 1924. Any suitable type of voltage-limiting valve or lightning arrester may be utilized.

In Fig. 7, I have shown the voltage-limiting means in the form of a plurality of resistors 58 which are connected between the mercury cathode 59 and the respective anodes 60 of a multi-anode, metal-tank, mercury-arc rectifier, individual anode-lead reactors 62 being utilized as heretofore described. Thus, if the maximum inverse voltage of 1600 volts is not to be exceeded, and if the shunting resistor 58 must carry current of .05 ampere in order to reduce the glow-discharge anode-current to 50 milliamperes or .05 amperes, immediately after the cessation of the backfire-cause and while the current in the reactor is still flowing at the rate of .1 ampere, or .05 more than the normal maximum inverse current in the rectifier, the shunting resistance must have a value of about 32,000 ohms, which would result in a very insignificant energy-loss.

In Fig. 8, I have shown the voltage-limiting means as a condenser 64 which is shunted across the anode and cathode of the rectifier to be protected, the anode-lead reactor 55 being utilized as previously described. Fig. 8 also indicates an important feature of my invention, in that rectifiers of other than normal or conventional design may be utilized with my invention. This may be explained as follows:

The frequency of the occurrence of precipitating causes of backfires seems to increase with the positive ion current density to the electrodes holding the inverse voltage. On this account, the practice has been to use low pressures of mercury, shields, baffles, grids, etc., as these all reduce the positive ion current to the inactive anodes. Shields have been necessary also for the purpose of preventing mercury drops from striking the inactive anodes, as any such contact is a backfire-precipitating cause. The use of baffles, shields, etc., has the disadvantage, however, of very considerably raising the normal arc drop, thus lowering the efficiency of the rectifier, besides materially increasing the volume or size of the rectifier.

If the precipitating causes are prevented from producing short-circuits by the means described above, the shields and the baffles are no longer necessary and it becomes possible to obtain a high glow-voltage between an inactive anode and the cathode by close spacing of the anodes and cathode, by which is meant that the cathode falls within the dark space surrounding the anode, which, in previous metal-tank rectifiers, has been of the order of 4 to 8 inches of dark space, depending upon the vapor pressure, the current in the other electrodes, and the voltage.

Thus the construction shown in Fig. 8 may be utilized, consisting of a single flat anode 66, and a mercury pool 67 carried by a flat mercury cup 68, which is insulated from the anode by means of a porcelain ring 69, the whole being hermetically sealed, and evacuated by means of a pump-connection 70. A keep-alive of any desired or preferred construction must be utilized, as indicated at 71, the details of the keep-alive forming no part of my present invention. The anode and cathode may both be cooled by suitable means which are well known in the art, so that they may both operate at a relatively low temperature of about 35° C. in the metal parts. Since impacting mercury drops are no longer to be feared, because of my inverse-current-limiting reactor 65 and voltage-limiting means 64, this compact construction of a single-anode rectifier is made possible, producing an extremely efficient rectifier. It will be understood that any number of these rectifiers may be utilized for polyphase operation.

Fig. 9 shows a design of the self-inductance or reactor, utilizing a core having a portion of its length reduced in cross-section, as indicated at 73. It will be noted, from a study of the equations previously given for the design of the reactor, that the cross-sectional area of the core had to be made large in order to satisfy the conditions imposed as to the operation when the inverse current was of the order of one-tenth of an ampere. By having a short portion of the total length of reduced cross-sectional area, the B—H relationships, at the time of this coercive current-flow of one-tenth of an ampere, will not be materially changed from what it would be if the core had not been reduced in cross-section at 73, but the B—H relationship for very heavy saturation-currents will be determined almost solely by the saturation of the small section 73.

Thus, in Fig. 10, if the larger curve 74 represents the saturation curve of the large cross-section and the smaller curve 75 represents the saturation curve of the smaller section 73, the saturation curve of the core shown in Fig. 9 will bend from one curve to the other as indicated by dotted lines 76 in Fig. 10. It is desirable, in this design, to crowd as many turns of the winding 77 around the reduced section 73, as possible, in order to assist in saturating this section at a very low current. By means of the design shown in Fig. 9, the reactance of the reactor, when carrying load currents, may be made smaller than if a core of uniform section had been used.

In general, it has been found that the effect of capacitance between the turns of the coil is quite negligible. In extreme designs of reactors utilizing my invention, it is anticipated that the distributed capacity of the coil-winding may make it impossible to limit the current to, say, .05 ampere for $10^{-4}$ seconds, because this distributed capacity permits the current-magnitudes in the various turns of the coil to be different.

If any backfire-cause occurs, the end turn of the coil discharges first. For this end turn, the inductance, due to its proximity to the iron core, is very small, and the opposition to the flow of current is practically that corresponding to the surge impedance which it would have if it were a straight conductor of the same section and the same proximity to grounded conducting material. That is, the initial impedance for the discharge might be only a few hundred ohms. Then as the discharge penetrates into the coil, the mutual magnetic effect of the turns comes into play, and the impedance increases until finally, when the discharge has completely penetrated into the coil, the impedance takes on the high value corresponding to the steady-state inductance of the coil. The time for this to happen is one half-cycle of a natural oscillation of the coil. After this period, the coil will be over-discharged, and there will be oscillations which will usually be rapidly damped.

As an example, consider a coil having an inductance, when unsaturated, of 1.0 henry, and a natural period of $10^4$ cycles. The initial impedance may be 500 ohms. Consider a voltage of 1500 volts suddenly impressed upon it. Due to its steady-state inductance, the current through it would rise at the rate of $$\frac{1500}{1.0} = 1500 \text{ amperes per second,}$$

so that, at the end of $10^{-4}$ seconds, the current would be only .015 ampere. Due to the transient, however, the initial current is $$\frac{1500}{500} = 3.0 \text{ amperes,}$$

and this damps down to a value comparable with the fraction of an ampere passed by the steady-state inductance, only after several times $10^{-4}$ seconds. Thus, the purpose of the coil, namely, to keep the current below .05 amperes for $10^{-4}$ seconds, is not accomplished, as indicated in the current-time curve of Fig. 11.

As previously indicated, I have not yet found it actually necessary to deal with these transient capacity currents; but I expect, in future refinements of my invention, and in the application thereof to new and more difficult rectifier problems, to be obliged to consider these effects. Figs. 12, 13, 14 and 15 show several means for overcoming the harmful effects of the capacity between the turns of the coil.

In Fig. 12, the surge impedance of the (equivalent straightened) conductor is made high by surrounding each turn of the coil with magnetic material. Thus the core is in the form of ring punchings 78 containing slots 79 and 80 on both the inner and outer peripheries. The punchings are piled in a stack of the proper height, and then the coil is wound around the stack, each coil-side resting in one of the slots. Then the iron magnetic circuit around each coil-side is closed by inner and outer stacks of smooth ring-punchings 81 and 82, and, if necessary, by additional laminations (not shown), pressed in vertical position, or otherwise, against the unprotected flat ends of the coil.

By surrounding each turn with magnetic material of permeability $\mu$, the initial surge-impedance is multiplied nearly in the ratio $$\sqrt{\mu}.$$

Thus, if $\mu$ is 10,000, then the initial surge-impedance is multiplied by nearly 100.

Fig. 13 shows another means for limiting the effect of transient capacity currents. As shown in this figure, the coil is so designed that a uniform distribution of potential along the turns of the coil will not call for the appearance of electric charge upon the turns of the coil. Thus, as diagrammatically shown in Fig. 13, a winding 84 lies between the core 85 and a surrounding tubular conducting shield 86. One end of the coil is connected to the core, as indicated at 87. The first turns of the coil are wound close to the core, and succeeding turns are spaced farther and farther from the core and closer to the shield, until the last turns of the coil are close to the shield, the end of the coil making electrical contact with the shield, as indicated at 88. In this way, the turns of the coil are at such points of the electrostatic field between the shield and the core, as correspond to a uniform distribution of potential along the turns of the coil. Hence, no charges appear on the coil, and there is no oscillation due to the development of such charges. I am speaking, now, of the oscillation due to the distributed capacity between the turns of the coil.

Fig. 14 shows another way of accomplishing the same result, namely, the almost instantaneous uniform distribution of potential along the turns of the coil, upon the application of voltage. According to this figure, small condensers 89 are connected between one end 90 of the coil and the respective successive turns 91, using such sizes of condensers as will bring each turn to its proper potential. By this means, charges will appear on the turns of the coil, but instead of having to flow through the winding, and, therefore, causing oscillations, these potentials are supplied directly to the turns by means of the condensers 89.

Fig. 15 shows a still further modification, and possibly the most convenient embodiment, of means for shunting each turn of the capacitor. In Fig. 15, these shunting capacitors 93 are equal in capacity and have a capacity large compared to the electrostatic capacity of the turns of the coil. They are connected between the successive turns and ensure that the voltage shall be uniformly distributed among the turns of the coil. Here, again, charges will appear on the turns of the coil, but they will be supplied instantly through the condensers and not with lag through the turns of the coil. The condensers 89 and 93, in both Figs. 14 and 15, while of very small capacity, possibly of the order of hundredths of microfarads, are nevertheless of large capacity as compared to the capacity between successive turns of the coil.

In the coil-constructions shown in Figs. 13, 14 and 15, the current which will flow, following a backfire-cause, will differ from the current which flows in the special reactor of Fig. 12, because the shield of Fig. 13, or the condensers 89 or 93 of Figs. 14 and 15, will produce a relatively large initial current-flow as the shield receives (or loses) charge, or as the turns of the coil receive (or lose) charge through the connected condensers, but this charging operation will be completed almost instantly, after which the current returns to a low value, within a time which is so short that a self-maintaining arc cannot be built up. In general, an initial rush of current, larger than the value of one-tenth of an ampere, or larger than one ampere, may be tolerated if this current is brought nearly to zero, or even reversed, within $10^{-4}$ seconds, or before a self-maintaining arc has had time to grow from the back-firing cause.

While I have indicated a number of different embodiments of means for preventing the inverse current, which flows as a result of a backfire-cause, from reaching a value which will produce a self-maintaining arc during the continuance of the backfire-cause, I contemplate that these illustrated means shall be taken as indicative, generally, of any means for temporarily taking over the rectifying function during a backfire-cause or temporary failure of the rectifier in question. Thus the saturated reactor of Fig. 1, while not a permanent rectifier in any sense of the word, is nevertheless a transient or temporary rectifier, due to its ability, as above pointed out, to interpose a very high impedance to the flow of inverse current for a very short time, of the order of $10^{-5}$ or $10^{-4}$ seconds, whereas it offers a very small impedance to the flow of current in the normal direction, due to the saturated condition of the reactor.

I intend, in my broadest claims appended, to include any means, external to a rectifier to be protected, for preventing the inverse current (resulting from a backfire-cause) from producing a self-sustaining arc, so that the increased inverse current-flow resulting from the backfire-cause will last only a very small fraction (of the order of one-thousandth, or less) of the total period of inactivity of the anode in question.

I claim as my invention:

1. A magnetizable-core reactor characterized by having a coercive magnetizing current of the order of .1 ampere, developing its operative voltage by changing from its remanent magnetism to zero induction in a time of the order of $10^{-5}$ second, and having a substantially instantaneous current-component in the winding, due to eddy currents in the core and elsewhere, of the order of .1 ampere or less.

2. A magnetizable-core reactor characterized by having a coercive magnetizing current of the order of .1 ampere, developing its operative voltage by changing from its remanent magnetism to zero induction in a time of the order of $10^{-5}$ second, and having a core made up of laminations of less than 5 mils thickness.

3. A magnetizable-core reactor characterized by having a coercive magnetizing current of the order of .1 ampere, developing its operative voltage by changing from its remanent magnetism to zero induction in a time of the order of $10^{-5}$ second, and having a core made up of laminations having a thickness of the order of 2 mils or less.

4. A magnetizable-core reactor capable of carrying current of the order of $10^3$ amperes during positive half-cycles, capable of withstanding negative voltages of the order of $10^3$ volts for time-periods of the order of $10^{-5}$ second without saturating in the negative direction, and capable of limiting the negative current to the order of $10^{-1}$ ampere within a time period of the order of $10^{-5}$ second.

5. The invention as defined in claim 4, characterized by means for causing a substantially instantaneous and substantially uniform distribution of a suddenly applied voltage among the turns of the reactor-coil.

6. The invention as defined in claim 4, characterized by the fact that the turns of the coil-sides of the reactor are substantially surrounded with magnetic material.

7. The invention as defined in claim 4, characterized by means for shielding the reactor-coil electrostatically so that a substantially uniform distribution of potential along the turns of the coil, on the sudden application of voltage thereto, will not call for the appearance of material electric charges upon the turns of the coil.

8. The invention as defined in claim 4, characterized by a tubular conducting shield surrounding, and spaced from, the core, one end of the reactor-winding being close to, and electrically connected to, the core and spaced from the shields, the other end of the reactor-winding being close to, and electrically connected to, the shield and spaced from the core, with intermediate turns of the reactor-winding spaced from both the core and the shield.

9. The claim as defined in claim 4, characterized by a plurality of condensers connected to a plurality of turns of the reactor-coil so as to cause a substantially instantaneous and substantially uniform distribution of a suddenly applied voltage among the turns of the reactor-coil.

10. The invention as defined in claim 4, characterized by the fact that the core has a portion of its length of reduced cross-section.

11. A rectifier of a type which is subject to random causes of breakdowns of the resistance to inverse current for short periods of time of the order of $10^{-5}$ seconds, or less, and subject to self-sustained inverse-current paths, as a result of said breakdown-causes, only if the inverse current during the continuance of said breakdown-causes shall increase to values greater than currents of the order of $10^{-1}$ amperes, in combination with an anode-circuit, a magnetizable-core reactor capable of carrying current of the order of $10^3$ amperes during positive half-cycles, capable of withstanding negative voltages of the order of $10^3$ volts for time-periods of the order of $10^{-5}$ second without saturating in the negative direction, and capable of limiting the negative current to the order of $10^{-1}$ ampere within a time period of the order of $10^{-5}$ second.

12. The invention as defined in claim 11, characterized by means for causing a substantially instantaneous and substantially uniform distribution of a suddenly applied voltage among the turns of the reactor-coil.

13. The invention as defined in claim 11, characterized by the fact that the turns of the coil-sides of the reactor are substantially surrounded with magnetic material.

14. The invention as defined in claim 11, characterized by means for shielding the reactor-coil electrostatically so that a substantially uniform distribution of potential along the turns of the coil, on the sudden application of voltage thereto, will not call for the appearance of material electric charges upon the turns of the coil.

15. The invention as defined in claim 11, characterized by a tubular conducting shield surrounding, and spaced from, the core, one end of the reactor-winding being close to, and electrically connected to, the core and spaced from the shield, the other end of the reactor-winding being close to, and electrically connected to, the shield and spaced from the core, with intermediate turns of the reactor-winding spaced from both the core and the shield.

16. The invention as defined in claim 11, characterized by a plurality of condensers connected to a plurality of turns of the reactor-coil so as to cause a substantially instantaneous and substantially uniform distribution of a suddenly applied voltage among the turns of the reactor-coil.

17. The invention as defined in claim 11, characterized by the fact that the core has a portion of its length of reduced cross-section.

18. The invention as defined in claim 11, characterized by capacitance means for causing an initial rush of inverse current, upon the occurrence of a breakdown-cause, and for causing said current to be reversed in a time of the order of $10^{-5}$ seconds.

19. The invention as defined in claim 11, characterized by external shunting-circuit means across the inverse-current discharge-path in the rectifier for limiting the inverse-current-discharge voltage in the rectifier, during the short period of time immediately following the cessation of a breakdown-cause, to values of the order of $10^3$ volts.

20. The invention as defined in claim 11, characterized by an external shunting-circuit lightning arrester across the inverse-current discharge-path in the rectifier for limiting the inverse-current-discharge voltage in the rectifier, during the short period of time immediately following the cessation of a breakdown-cause, to values of the order of $10^3$ volts.

21. The invention as defined in claim 11, characterized by an external shunting-circuit resistor across the inverse-current discharge-path in the rectifier for limiting the inverse-current discharge voltage in the rectifier, during the short period of time immediately following the cessation of a breakdown-cause, to values of the order of $10^3$ volts.

22. The invention as defined in claim 11, characterized by an external shunting circuit including a condenser across the inverse-current discharge-path in the rectifier for limiting the inverse-current-discharge voltage in the rectifier, during the short period of time immediately following the cessation of a breakdown-cause, to values of the order of $10^3$ volts.

23. A rectifier of a type which is subject to random causes of breakdowns of the resistance to inverse current for short periods of time of the order of $10^{-5}$ seconds, or less, and subject to self-sustained inverse-current paths, as a result of said breakdown-causes, only if the inverse current during the continuance of said breakdown-causes shall increase to values greater than currents of the order of $10^{-1}$ amperes, in combination with an anode-circuit magnetizable-core reactor characterized by having a coercive magnetizing current of the order of .1 ampere, developing its operative voltage by changing from its remanent magnetism to zero induction in a time of the order of $10^{-5}$ second, and having a substantially instantaneous current-component in the winding, due to eddy currents in the core and elsewhere, of the order of .1 ampere or less.

24. A rectifier of a type which is subject to random causes of breakdowns of the resistance to inverse current for short periods of time of the order of $10^{-5}$ seconds, or less, and subject to self-sustained inverse-current paths, as a result of said breakdown-causes, only if the inverse current during the continuance of said breakdown-causes shall increase to values greater than currents of the order of $10^{-1}$ amperes, in combination with an anode-circuit magnetizable-core reactor characterized by having a coercive magnetizing current of the order of .1 ampere, developing its operative voltage by changing from its remanent magnetism to zero induction in a time of the order of $10^{-5}$ second, and having a core made up of laminations of less than 5 mils thickness.

25. A rectifier of a type which is subject to random causes of breakdowns of the resistance to inverse current for short periods of time of the order of $10^{-5}$ seconds, or less, and subject to self-sustained inverse-current paths, as a result of said breakdown-causes, only if the inverse current during the continuance of said breakdown-causes shall increase to values greater than currents of the order of $10^{-1}$ amperes, in combination with an anode-circuit, magnetizable-core reactor characterized by having a coercive magnetizing current of the order of .1 ampere, developing its operative voltage by changing from its remanent magnetism to zero induction in a time of the order of $10^{-5}$ second, and having a core made up of laminations having a thickness of the order of 2 mils or less.

26. A plurality of rectifying, anode-circuit paths of a type which is subject to random causes of breakdowns of the resistance to inverse current for short periods of time of the order of $10^{-5}$ seconds, or less, and subject to self-sustained inverse-current paths, as a result of said breakdown-causes, only if the inverse current during the continuance of said breakdown-causes shall increase to values greater than currents of the order of $10^{-1}$ amperes, in combination with an anode-circuit, magnetizable-core coupling reactor, coupling two or more anode-circuit paths, capable of carrying current of the order of $10^3$ amperes during positive half-cycles, capable of withstanding negative voltages of the order $10^3$ volts for time-periods of the order of $10^{-5}$ second without saturating in the negative direction, and capable of limiting the negative current to the order of $10^{-1}$ ampere within a time of the order of $10^{-5}$ second.

27. A plurality of rectifying, anode-circuit paths of a type which is subject to random causes of breakdowns of the resistance to inverse current for short periods of time of the order of $10^{-5}$ seconds, or less, and subject to self-sustained inverse-current paths, as a result of said breakdown-causes, only if the inverse current during the continuance of said breakdown-causes shall increase to values greater than currents of the order of $10^{-1}$ amperes, in combination with an anode-circuit, magnetizable-core coupling-reactor, coupling two or more anode-circuit paths, characterized by having a coercive magnetizing current of the order of .1 ampere, developing its operative voltage by changing from its remanent magnetism to zero induction in a time of the order of $10^{-5}$ second, and having a substantially instantaneous current-component in the winding, due to eddy currents in the core and elsewhere, of the order of .1 ampere or less.

28. A plurality of rectifying, anode-circuit paths of a type which is subject to random causes of breakdowns of the resistance to inverse current for short periods of time of the order of $10^{-5}$ seconds, or less, and subject to self-sustained inverse-current paths, as a result of said breakdown-causes, only if the inverse current during the continuance of said breakdown-causes shall increase to values greater than currents of the order of $10^{-1}$ amperes, in combination with an anode-circuit, magnetizable-core coupling-reactor, coupling two or more anode-circuit paths, characterized by having a coercive magnetizing current of the order of .1 ampere, developing its operative voltage by changing from its remanent magnetism to zero induction in a time of the order of $10^{-5}$ second, and having a core made up of laminations of less than 5 mils thickness.

29. A plurality of rectifying, anode-circuit paths of a type which is subject to random causes of breakdowns of the resistance to inverse current for short periods of time of the order of $10^{-5}$ seconds, or less, and subject to self-sustained inverse-current paths, as a result of said breakdown-causes, only if the inverse current during the continuance of said breakdown-causes shall increase to values greater than currents of the order of $10^{-1}$ amperes, in combination with an anode circuit, magnetizable-core coupling-reactor, coupling two or more anode-circuit paths, characterized by having a coercive magnetizing current of the order of .1 ampere, developing its operative voltage by changing from its remanent magnetism to zero induction in a time of the order of $10^{-5}$ second, and having a core made up of laminations having a thickness of the order of 2 mils or less.

30. A plurality of rectifying, anode-circuit paths of a type which is subject to random causes of breakdowns of the resistance to inverse current for short periods of time of the order of $10^{-5}$ seconds, or less, and subject to self-sustained inverse-current paths, as a result of said breakdown-causes, only if the inverse current during the continuance of said breakdown-causes shall increase to values greater than currents of the order of $10^{-1}$ amperes, in combination with an anode-circuit, magnetizable-core coupling-reactor, coupling two or more anode-circuit paths, for causing the inverse current in a broken-down anode-circuit-rectifying path to be small enough to prevent the establishment of a self-sustaining inverse-current path at the termination of a breakdown-cause.

31. A rectifier of a type subject to temporary breakdown of the resistance to inverse current, and subject to self-sustaining inverse current paths if the inverse current shall increase to a value greater than the order of one-tenth ampere during said temporary breakdown, in combination with an anode circuit, a magnetizable core reactor capable of carrying current of the order of 1000 amperes during positive half-cycles, capable of withstanding negative voltages of the order of 1000 volts for time period of the order of one-hundredth of a second without saturating in the reverse direction, and capable of limiting the inverse current to values of the order of one-tenth ampere within a time period of one-hundred thousandth of a second.

JOSEPH SLEPIAN.